(12) United States Patent
Mehta et al.

(10) Patent No.: US 9,037,678 B2
(45) Date of Patent: May 19, 2015

(54) DISTRIBUTION OF MESSAGES IN SYSTEM LANDSCAPES

(75) Inventors: Harish Mehta, Walldorf (DE); Florian Chrosziel, Walldorf (DE); Otto Boehrer, Wiesloch (DE); Marco Rodeck, Maikammer (DE); Joerg Kraemer, Sinsheim (DE); Rita Merkel, Walldorf (DE); Thomas Kunz, Lobbach/Lobenfeld (DE)

(73) Assignee: SAP SE, Walldorf (DE)

( * ) Notice: Subject to any disclaimer, the term of this patent is extended or adjusted under 35 U.S.C. 154(b) by 379 days.

(21) Appl. No.: 13/470,483

(22) Filed: May 14, 2012

(65) Prior Publication Data

US 2013/0304849 A1 Nov. 14, 2013

(51) Int. Cl.
G06F 15/16 (2006.01)
H04L 29/06 (2006.01)
H04L 29/08 (2006.01)

(52) U.S. Cl.
CPC .......... *H04L 63/02* (2013.01); *H04L 29/08072* (2013.01); *H04L 29/06* (2013.01); *H04L 67/2866* (2013.01)

(58) Field of Classification Search
CPC .......................... H04L 29/08072; H04L 29/06
USPC ......................................................... 709/217
See application file for complete search history.

(56) References Cited

U.S. PATENT DOCUMENTS

| | | | |
|---|---|---|---|
| 7,457,792 B2 | 11/2008 | Weigt et al. | |
| 7,457,793 B2 | 11/2008 | Weigt et al. | |
| 7,457,794 B2 | 11/2008 | Weigt et al. | |
| 7,587,386 B2 | 9/2009 | Rabetge et al. | |
| 7,756,808 B2 | 7/2010 | Weigt et al. | |
| 7,756,809 B2 | 7/2010 | Weigt et al. | |
| 7,761,396 B2 | 7/2010 | Weigt et al. | |
| 8,051,034 B2 | 11/2011 | Mehta et al. | |
| 2004/0202330 A1* | 10/2004 | Harvey et al. | 380/277 |
| 2007/0027866 A1* | 2/2007 | Schmidt-Karaca | 707/6 |
| 2007/0043842 A1* | 2/2007 | Chouanard et al. | 709/223 |
| 2007/0179906 A1* | 8/2007 | Frankel et al. | 705/75 |
| 2008/0178169 A1* | 7/2008 | Grossner et al. | 717/170 |
| 2008/0244623 A1* | 10/2008 | Graser et al. | 719/328 |
| 2008/0288549 A1 | 11/2008 | Rabetge et al. | |
| 2008/0313189 A1 | 12/2008 | Mehta et al. | |
| 2010/0161712 A1* | 6/2010 | Mehta et al. | 709/203 |
| 2010/0242053 A1* | 9/2010 | Nitzsche et al. | 719/317 |
| 2010/0281096 A1* | 11/2010 | Breuil | 709/201 |
| 2011/0138050 A1* | 6/2011 | Dawson et al. | 709/226 |
| 2011/0282915 A1* | 11/2011 | Steer et al. | 707/802 |
| 2012/0324456 A1* | 12/2012 | Teather | 718/102 |
| 2013/0104202 A1* | 4/2013 | Yin et al. | 726/5 |

* cited by examiner

*Primary Examiner* — Chris Parry
*Assistant Examiner* — Weiwei Stiltner
(74) *Attorney, Agent, or Firm* — Fish & Richardson P.C.

(57) ABSTRACT

Systems, computer products, and computer-implemented methods may be directed to publishing information about a service offered by a service provider at a first services registry. The information about the service can be communicated to a second services registry. An indication of a subscription to the service may be received by a service consumer from the second services registry. Information about the subscribed service can be communicated to the second services registry.

19 Claims, 7 Drawing Sheets

*402* — SERVICES REGISTRY CONSUMER SETTINGS (TIP CORE XYZ DB SYSTEM NGAP 8.04; BCN; 100)

System: Local System ▼

Services Registry Connections | Publication Rules | Assignments

Services Registry Connections

Create / Edit 🗑 Delete | ⇄ Ping ⬇ Update Cache

| Name | Version | Consumer Proxy | Logical Port |
|---|---|---|---|
| SR_LOCAL | 3.0 | CO_SERVICES_REGISTRY | $sc$>3.CSERVICESREGISTRY |
| SR_PDS_000 | 1.1 | CO_SERVICES_REGISTRY_FLAT_SI | LP_PDS_000 |
| WORKPLACE_SR | 1.1 | CO_SERVICES_REGISTRY_FLAT_SI | LP_WORKPLACE |

*404* — SERVICES REGISTRY CONSUMER SETTINGS (TIP CORE XYZ DB SYSTEM NGAP 8.04; BCN; 100)

System: Local System ▼

Services Registry Connections | Publication Rules | Assignments

Publication Rules

Create ▲ Delete

| Publication Rule Name | Description |
|---|---|
| SR_CENTRAL | Publication Rule generated for Central Services Registry |
| SR_LOCAL | Publication Rule generated for Local Services Registry |
| CUSTOMER_RULE | RULE FOR WORKPLACE SERVICES REGISTRY |

Edit ▲ | Save | Cancel

Objects | Administrative Information

Objects

| Object Type | Classification Name | Sign | Option | Low |
|---|---|---|---|---|
| WSD Classification | DeploymentUnit (http://uddi.xyz.com/classification) | Including | Equal | SCM Foundation Layer |

DISTRIBUTION OF MESSAGES IN SYSTEM LANDSCAPES

FIELD

The present disclosure pertains to systems, methods, and computer program products for distributing system lifecycle information, and more particularly, to simplified administration of system lifecycle activities.

BACKGROUND

In business-to-business (B2B) scenarios covering multiple system landscapes separated by so-called DMZs and firewalls, it is difficult to get an overview about connectivity entities and their relationships (e.g. which Web Service provider is used by which Web Service Consumers). In such environments this information is needed for life cycle activities like system configuration, preparation and maintenance. These activities are complicated because of the federated environment, various system borders and independent system administration. To support such life cycle activities, various relevant messages have to be exchanged between the system components so that they can synchronize with each other.

SUMMARY

The details of one or more implementations of the disclosure are set forth in the accompanying drawings and the description below. Other features, objects, and advantages of the disclosure will be apparent from the description and drawings, and from the claims.

Certain aspects of the present disclosure are directed to a system for distributing messages in a system landscape. Such a system landscape may include a B2B landscape or other enterprise landscape. A first services registry may be configured receive a message from a backend system. A second services registry may be configured receive the message from the first services registry.

Certain aspects are directed to a computer-implemented method may include publishing information about a service offered by a service provider at a first services registry. The information about the service may be communicated to a second services registry. An indication of a subscription to the service may be received by a service consumer from the second services registry. Information about the subscribed service can be communicated to the second services registry.

Certain aspects are directed to a computer program product tangibly embodied on non-transitory media, the computer program product operable to execute instructions, which may include publishing information about a service offered by a service provider at a first services registry. The instructions may also include communicating the information about the service to a second services registry. An indication of a subscription to the service may be received by a service consumer from the second services registry. The instructions may include communicating information about the subscribed service to the second services registry.

In certain aspects the first services registry may be separated from the second services registry by a firewall. The second services registry may be configured to communicate messages to a second backend system. The first services registry can store information about the backend system. In certain implementations, the first services registry may be configured to identify authorized users of information contained in the message. The first services registry may filter data in the message based on a rule and transmits the filtered message to the second services registry. The message may include one or more of information about the backend system, routing information, or publishing time stamps. In certain aspects of the implementations, a third services registry, the third services registry configured to communicate messages between the second services registry and a second backend system.

Certain aspects of the implementations may include receiving configuration information about the service at the first services registry. Communicating information about the subscribed service to the second services registry may be based on the configuration information. In certain implementations, the configuration information may include one or more of publication authorization information, viewer authorization information, subscription information, or read/write authorization. In certain implementations, the first services registry is separated from the second services registry by a firewall. The second services registry may be associated with the service consumer.

In certain implementations, communicating information about the subscribed service to the second services registry may include communicating changes to the subscribed service to the service consumer. In certain implementations, communicating information about the subscribed service to the second services registry may include communicating information about the service provider.

DETAILED DESCRIPTION

The connectivity entities, such as Web Service providers and consumers, may be published together with their system information and metadata (e.g., description, documentation, and classifications, etc.) into a repository called a Services Registry. A Services Registry may also contain information about relationships between the published entities. These entities can be queried from Services Registry in order to get overviews and detailed information. Additionally it is possible to subscribe to such entities: for example, a Web Service consumer can subscribe to a Web Service provider, which results in a relationship between both entities in Services Registry.

Services Registries can be connected together in such a way that they can exchange information with each other. Publication Rules can be defined in order to decide what kind of content (entities) should be published or forwarded to connected Services Registries. Forwarding of such information enhanced with original system, routing information and publishing time stamps enables the possibility to get an overview about the relationships of entities originated from different systems (e.g., which provider of which system is used by which consumer of which system).

There can be multiple Services Registries within a system landscape. In certain implementations, a system can have multiple partitions on the application level. These partitions may be referred to as 'clients' or 'ABAP Clients.' They are used to differentiate certain kinds of business data on application level (e.g., master data vs. regular data; test data vs. productive data; etc.). An system may have up to 1000 such clients. Each client may contain a local instance of services registry.

For example, one services registry can reside within a DMZ, and two other services registries can each reside on a different side of the DMZ and can communicate to the one in the DMZ (i.e. one internal and one external for B2B communication). Building up such a chain of Services Registries having the ability to exchange and forward sets of their entities and relations to each other allows communication and synchronization across system borders. As result, every participating system gets the desired information out of its local Services Registry (without direct interaction with the source system from where the information is originating). This way one can support the life-cycle activities mentioned above. The architecture also provides communication and synchronization between other connectivity entities and not only for Web Service providers and consumers. It combines various concepts concerning a publication/subscription (pub-sub) mechanism to support life-cycle aspects and the distribution of information to different systems. The pub-sub mechanism includes a mechanism where a service provider publishes some service and consumers can subscribe on it. In addition to the pub-sub mechanism, the present disclosure is directed to providing an overview about the system landscape artifacts (e.g., which service is offered by whom and who is the subscriber of a service); identifying a route determination (e.g., determination of the source of a message and hence track a message to inform the originating system); forwarding service/system information (originating from a system) with the help of multiple SRs available in between; defining and applying publication Rules to filter information to be published from backend in a particular services registry; and providing publication Views as a method to authentication and restrict the access for a services registry user.

Figure 1:
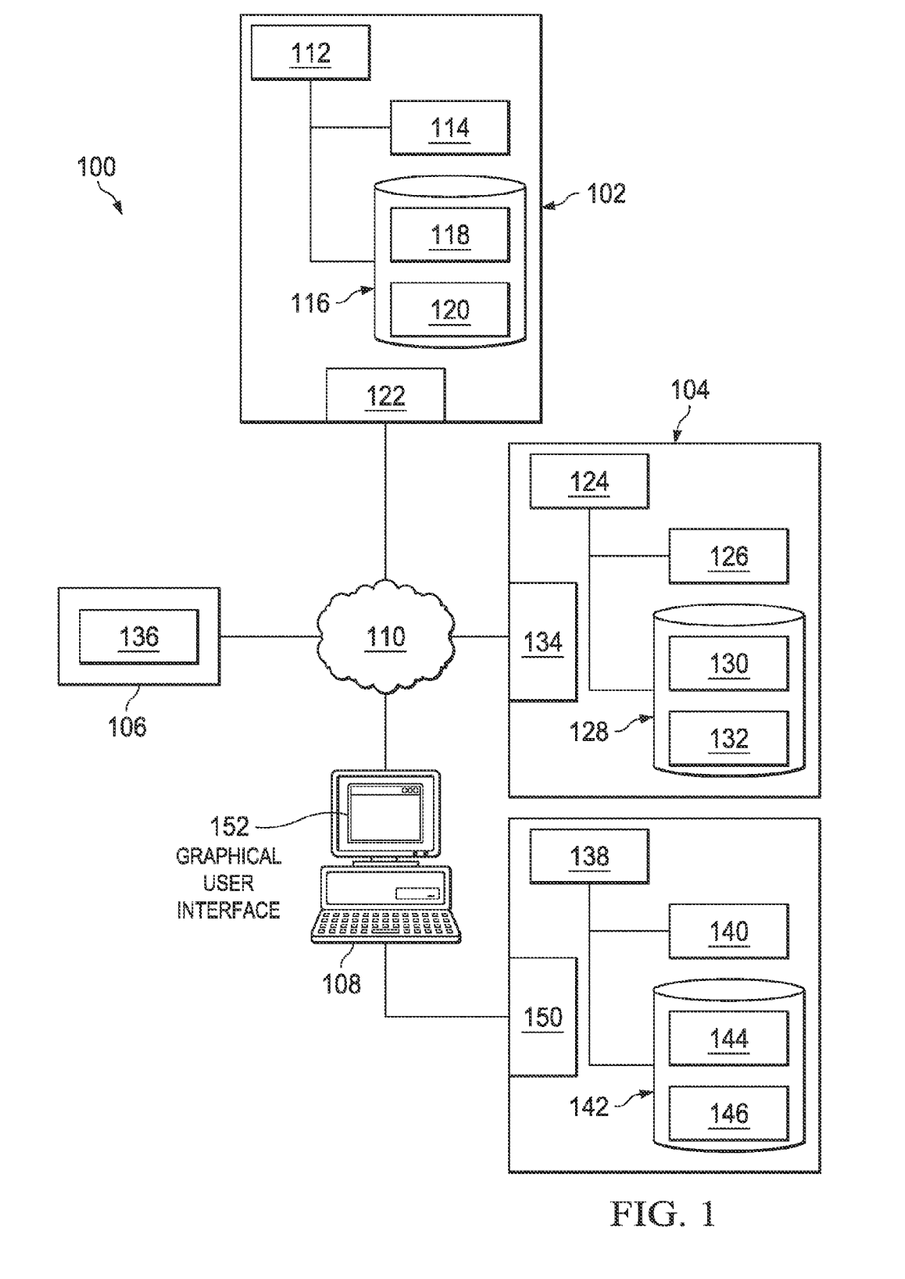
FIG. 1 is a schematic illustration of a system landscape for distributing messages using service registries.

FIG. 1 is a schematic illustration of a system landscape 100 for distributing messages using service registries. System landscape 100 includes (as an example) a first backend system 102 and a second backend system 104, as well as a remote system 106 that includes a system registry 136. System landscape 100 also includes a client 108. The first backend system 102, the second backend system 104, the remote system 106, and the client 108 can communicate with each other via a network 110.

First and second backend systems 102 and 104 may include any computer or processing device such as a mainframe, a blade server, general-purpose personal computer (PC), Macintosh®, workstation, UNIX-based computer, or any other suitable device. Generally, FIG. 1 provides merely one example of computers that may be used with the disclosure. In other words, the present disclosure contemplates computers other than general purpose computers, as well as computers without conventional operating systems. The term "computer" is intended to encompass a personal computer, workstation, network computer, mobile computing device, or any other suitable processing device. For example, system landscape 100 can be implemented using computers other than servers, as well as a server pool. The backend systems may be adapted to execute any operating system including z/OS, Linux-Intel® or Linux/390, UNIX, Windows Server, or any other suitable operating system. According to one implementation, first backend system 102 may also include or be communicably coupled with a web server and/or an SMTP server.

The first backend system 102 includes a processor 112. The backend systems may be a service provider or a consumer of services. Processor 112 may execute an application 114 that can be used to configure messages as well as the services registry 118 stored in memory 116 along with data (including metadata) 132. Processor 112 can be, for example, a central processing unit (CPU), a blade, an application specific integrated circuit (ASIC), or a field-programmable gate array (FPGA), or other type of processor. Although FIG. 1 illustrates a single processor 112 in first backend system 102, multiple processors may be used according to particular needs, and reference to processor 112 is meant to include multiple processors where applicable. The second backend system 104 may include similar features as first backend system 102. For example, the second backend system may include a processor 124 that executes instructions to run application 126 (which may be similar to application 114). A services registry 130 may be stored in a memory 128, along with data (including metadata) 132.

In general, a services registry permits two backend systems to communicate with each other. The services registry collects messages, for example, based on web service connectivity. With the help of SOAP-based APIs, information gets stored into this component or gets extracted out of the business system. The system information is useful for informing other systems whenever some change happens in some system. For example, if a system goes to maintenance for a several days, a message gets broadcasted to the appropriate receiver(s) who are using the service so that they can prepare for the maintenance event, which is going to happen in the future. So, a publication message can be generated, and this publication message will be forwarded to the appropriate receiver who is interested in this service.

Application 114 may be web-based application displayed on a web browser, or may be accessible across the network 110. The application 114 may be used to configure, customize, or otherwise access services registry 118. Services registry 118 is part resides in first backend system 102. First backend system 102 may be a business system or a net viewer system. Business systems include SAP ByDesign or any business suite or any ERP, CRMs, SCM, XCM system. The first backend system 102 can exchange messages with other systems, such as second backend system 104, using services registry 118 and services registry 130. The backend systems may be within the same system landscape 100, however, they may across landscapes (e.g., communication between two businesses or two companies).

First backend system 102 may also include interface 122 for communicating with other computer systems, such as client 108, over network 110 in a client-server environment or any other type of distributed environment. In certain implementations, first backend system 102 receives requests for data access from local or remote senders through interface 122 for storage in memory 116 and/or processing by processor 112. Generally, interface 122 comprises logic encoded in software and/or hardware in a suitable combination and operable to communicate with network 110. More specifically, interface 122 may comprise software supporting one or more communication protocols associated with communications network 110 or hardware operable to communicate physical signals.

Memory 116 may include any memory or database module and may take the form of volatile or non-volatile memory including, without limitation, magnetic media, optical media, random access memory (RAM), read-only memory (ROM), removable media, or any other suitable local or remote and/or distributed memory and retrieved across a network, such as in a cloud-based computing environment.

Network 110 facilitates wireless or wireline communication between computer first backend system 102 and any other local or remote computer, such as client 108. Network 110 may be all or a portion of an enterprise or secured network. In another example, network 110 may be a VPN merely between first backend system 102 and client 108 across a wireline or wireless link. Such an example wireless link may be via 802.11a, 802.11b, 802.11g, 802.11n, 802.20, WiMax, and many others. The wireless link may also be via cellular technologies such as the 3rd Generation Partnership Project (3GPP) Global System for Mobile Communications (GSM), Universal Mobile Telecommunications System (UMTS), Long Term Evolution (LTE), etc. While illustrated as a single or continuous network, network 110 may be logically divided into various sub-nets or virtual networks without departing from the scope of this disclosure, so long as at least portion of network 110 may facilitate communications between senders and recipients of requests and results. In other words, network 110 encompasses any internal and/or external network, networks, sub-network, or combination thereof operable to facilitate communications between various computing components in system landscape 100. Network 110 may communicate, for example, Internet Protocol (IP) packets, Frame Relay frames, Asynchronous Transfer Mode (ATM) cells, voice, video, data, and other suitable information between network addresses. Network 110 may include one or more local area networks (LANs), radio access networks (RANs), metropolitan area networks (MANs), wide area networks (WANs), all or a portion of the global computer network known as the Internet, and/or any other communication system or systems at one or more locations. In certain implementations, network 110 may be a secure network associated with the enterprise and remote client 108.

Figure 2:
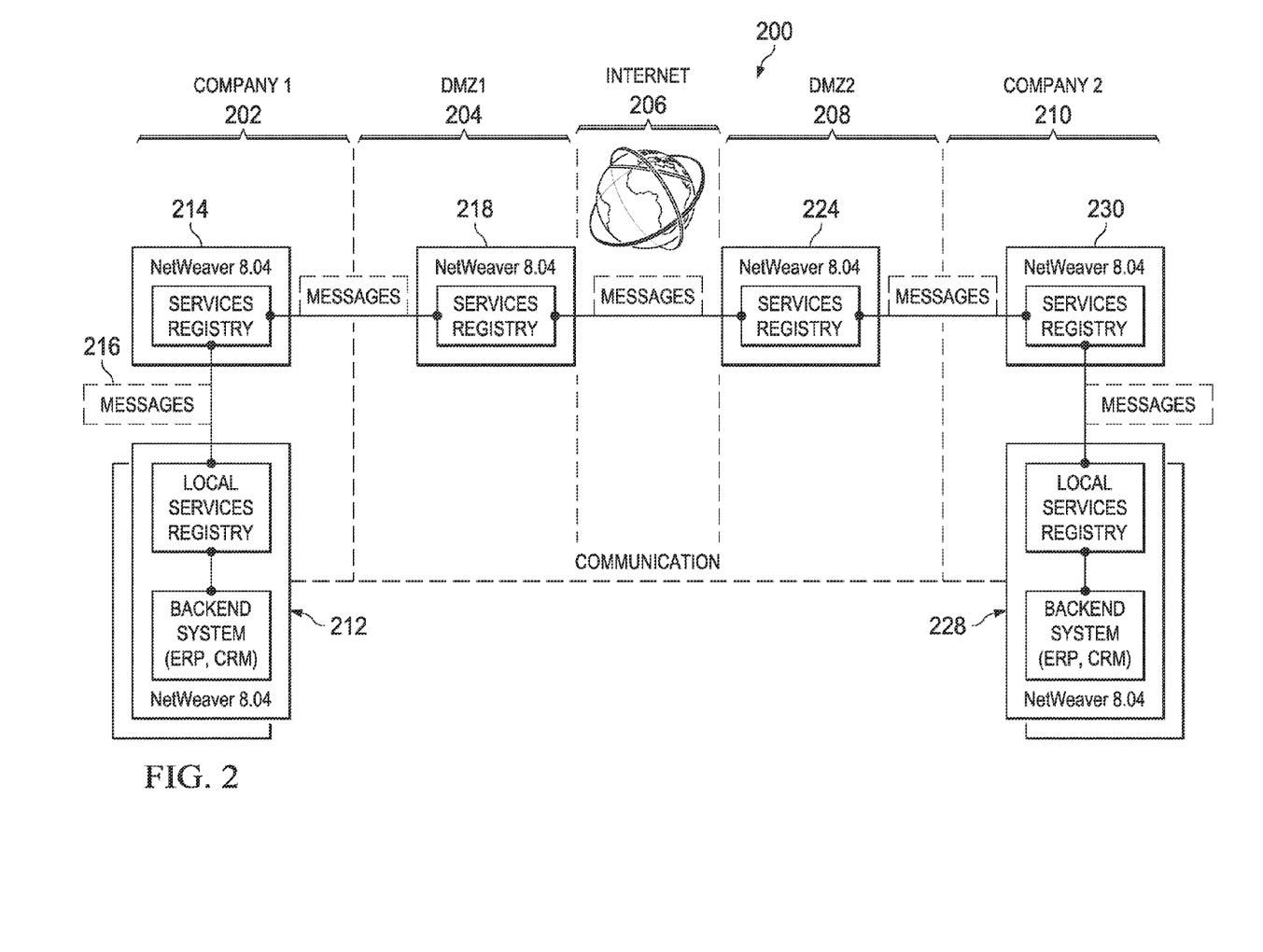
FIG. 2 is a schematic representation of an example system landscape.

A remote system 106 may communicate with backend systems and/or the client 108 across a network 110. The remote system 106 may store and maintain a services registry 136 that is accessible by first backend system 102 and by other backend systems in the system landscape 100 or other system landscapes. The remote system 106 resides in a DMZ or outside of a backend system firewall (as shown in FIG. 2).

System landscape 100 allows for a client, such as client 108, to view a graphical representation of information related to a corporate network. System landscape 100 may include more than one client. The backend systems and client 108 communicate across a network 110. Client 108 may request services from a backend system, such as first backend system 102, and/or may provide user information to backend systems concerning desired or requested services (such as the type of service, authorization/authentication details, publication rules, etc.), which may be maintained in the services registry. Client 108 may also define conditions or constraints for the distribution of user-specific information. The client 108 can communicate with backend systems using an application 140 executed by a processor 138 (similar to processor 112). The application 140 may be a web-based application, a local application, or an interface to run a remote application. The application 140 may use data stored in a local memory 142, which can store data 146 and/or local services registry 144, or may use data stored elsewhere, such as on a remote repository, cloud-based system, or in-memory system.

It will be understood that there may be any number of clients 108 communicably coupled to backend systems. This disclosure contemplates that many clients may use a computer or that one user may use multiple computers to submit or review queries via a graphical user interface (GUI) 152. As used in this disclosure, client may operate remote devices, such as personal computers, touch screen terminals, workstations, network computers, kiosks, wireless data ports, wireless or wireline phones, personal data assistants (PDAs), one or more processors within these or other devices, or any other suitable processing device, to execute operations associated with business applications. For example, client 108 may be a PDA operable to wirelessly connect with an external or unsecured network. In another example, client 108 may comprise a laptop that includes an input device, such as a keypad, touch screen, mouse, or other device that can accept information, and an output device that conveys information associated with the operation of first backend system 102 or client 108, including digital data, visual information, or GUI 152. Both the input device and output device may include fixed or removable storage media such as a magnetic computer disk, CD-ROM, or other suitable media to both receive input from and provide output to users of client 108 through the display 120, namely over GUI 152.

GUI 152 includes a graphical user interface operable to allow the user of client 108 to interface with at least a portion of system landscape 100 for any suitable purpose, including viewing, manipulating, editing, etc., graphic visualizations of user profile data. Generally, GUI 152 provides the user of client 108 with an efficient and user-friendly presentation of data provided by or communicated within system landscape 100. GUI 152 may comprise a plurality of customizable frames or views having interactive fields, pull-down lists, and buttons operated by the user. In one implementation, GUI 152 presents information associated with queries and buttons and receives commands from the user of client 108 via one of the input devices. Moreover, it should be understood that the terms graphical user interface and GUI may be used in the singular or in the plural to describe one or more graphical user interfaces and each of the displays of a particular graphical user interface. Therefore, GUI 152 contemplates any graphical user interface, such as a generic web browser or touch screen, which processes information in system landscape 100 and efficiently presents the results to the user. First backend system 102 can accept data from client 108 via the web browser (e.g., Microsoft® Internet Explorer or Mozilla® Firefox) and return the appropriate HTML or XML responses using network 110. For example, first backend system 102 may receive a request from client 108 using a web browser or application-specific graphical user interface, and then may execute the request to store and/or retrieve information pertaining to corporate data.

FIG. 2 is a schematic representation of an example system landscape 200. Each backend system 212 and 228 (e.g. ERP, CRM or ByD Tenant) in the system landscape 200 establishes a connection to its known services registry 214 and 230, respectively, in, e.g., SOA Manager. (In FIG. 2, each backend system includes a local services registry. A services registry system establishes a connection to another services registry in a similar way. For example, services registry 214 associated with company 1 202 establishes a connection with services registry 218, which resides in DMZ1 204 (outside company 1's firewall). Publication rules may be defined in each system (e.g., backend and services registry) to be able to restrict and filter the content, which is then published in the assigned services registry. This makes sure that the desired messages are published or pulled to services registry. Similarly, there are publication rules here available on this part and there are views available on this side so that similar kind of checks can be done once the communication takes place between the services entities, between two services entities, the communication.

Message forwarding takes place between the services registries and is performed, in part, by maintaining forwarding rules that affect the forwarding of messages between services registries. The forwarding rules may include rules to collect information to collect source information from where the message is originating. In the example flow shown in FIG. 2, a message 216 goes from the first backend system 212 to a service registry 214. The message 216 is subjected to publication, forwarding, and other rules before it is communicated to a services registry 218 outside the firewall. The message 216 may also take on information about the backend system 212 and the services registry 214 (in accordance to rules associated with the respective systems). The message 216 can be communicated to another services registry 224 in DMZ2 208 across the network 206, such as the Internet. The message 216 can be subjected to other rules in services registry 224 and can deliver information about the previous systems (backend system 212 and services registry 214. When a backend system on a consumer side subscribes to a service, then the subscription message automatically knows from where the message is coming. So a subscription message does not need to know the rules and does not need to know in general where it has to go. It knows automatically the routing and the message flow because it will follow the same path from where this publication came (identified in the message). And, once the message 216 reaches the last services registry 230, the associated backend system 228 knows that the message 216 started from the backend system 212.

Figure 3:
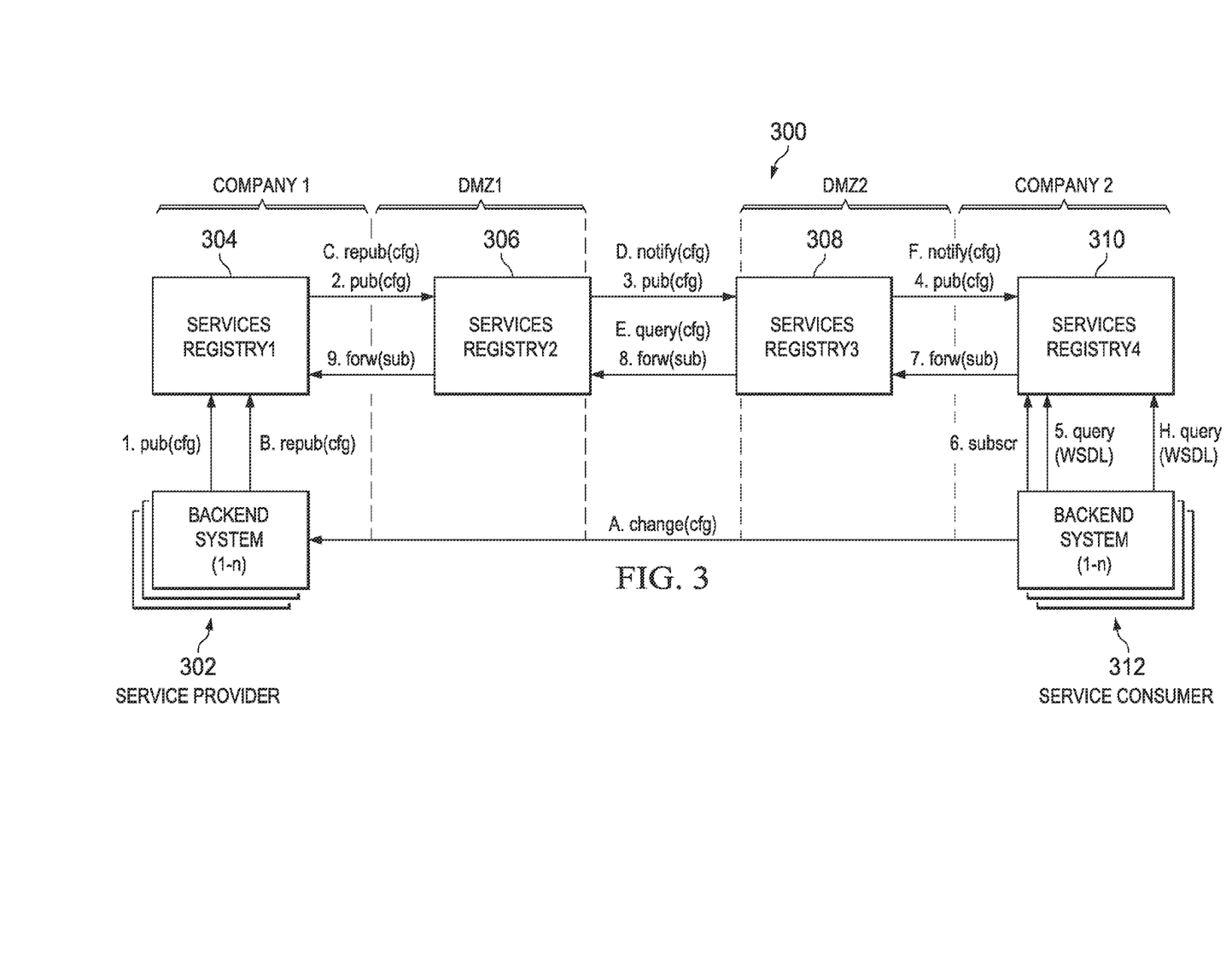
FIG. 3 is a schematic illustration of an example system landscape showing an example message transfer using services registries.

FIG. 3 is a schematic illustration of an example system landscape 300 showing an example message transfer using services registries. First, a backend system service provider 302 publishes information to services registry 1 304. The published information is communicated to services registry 2 306 that resides in DMZ1. The published information is communicated to services registry 3 308 in DMZ2 and then to services registry 4 310, which is associated with backend system service consumer 312. Service consumer 312 can query services registry 4 310 to receive information from service provider 302 (e.g., using a pull function or a push function established between the backend system and the services registry 4 310). The service consumer 312 can subscribe to the service provider 302, and the subscription message is communicated to services registry 1 304 across the other services registries 306 and 308. If and when a change occurs at service provider 302, the service provider 302 can republish the information to the services registry 304, and the republished information is communicated across services registries 306 and 308 to services registry 310. The service consumer 312 can then receive the updated information from services registry 310. Additionally, services registry 3 306 can query services registry 2 308 to request information about service provider 302.

Connections can be maintained between every back-end in the landscape, establishing a connection to its known services entity. Publication rules and views parameters can be maintained within that system and these rules can be assigned to a corresponding registry in the assignment area. The example shown in FIG. 3 is an example of two companies (a service provider and a service consumer) where like multiple systems are available on both the sides and they communicate with each other, using a technical protocol, a web service, IDOC, RFC protocol. Each system can be an ERP or CRM system or it can be some other business system, and each system has an instance of this component. The communication of messages can be a one way communication or it can be a multiple-way communication. A similar infrastructure can be maintained between the two services and between internal and external services between two companies, and then the same pattern can follow there in another company's landscape. Messages can be publications, subscriptions, notifications, maintenance information, or general event or protocol information, which are useful and, in some instances, particular for the consumer system, or other information.

A change of information can also triggers message distribution, and that change can be anything. For example, the service may have been previously running with a particular user password identification, but this security level gets changed. A message may be communicated to say that the service will be no longer be available with user password, but rather it should run with some other kind of security identification or aspects, such as with certificates, or other mechanism. In that case, the information gets republished and is again forwarded to the next registry, which will then notify to the next registry. But before this happens, the consuming system should also subscribe to this service. So the subscription gets also assisted in all these registries Once the service gets published for the first time, the subscription can get propagated into all the registries, and then once the change takes place at the originating back-end, this change notifies the right consumer(s) (because there may be several systems in the system landscape that are in communication between the originating backend system that do not subscribe to the particular service with which the change is associated. Services registry architecture (chaining mechanism between multiple registries) allows for the informing of the right consumer with the help of subscriptions.

Another example notification may include maintenance scheduling. For example, a back-end system might go through maintenance on the weekend and can notify all the subscribers that this maintenance is going on in the coming weekend and will not be available on the weekend. The consumer system(s) can adjust according to the solution in that case. There can be a binding, or the service available, and there are two subscribers here for this binding. There can be multiple bindings and/or multiple subscribers. Any change on this binding level on this service on this binding will notify all the subscribers because the subscriptions are persisted in each and every registry. The term "binding" can imply an endpoint of a service. A web service is callable if its binding exists. With the help of this binding, service consumer systems are able to call the application functionality written behind this web service. In certain implementations, the term "binding" is synonymous with the term "endpoint." With the help of those subscriptions registries, systems are capable of identifying the subscribers or consumers of that service, and notifying them accordingly. Services Registry communicates with another Services Registry via SOAP based proprietary APIs described by a WSDL. Third party software can easily understand and implement these APIs to be able to communicate with SAP Services Registry and hence profit from this messing infrastructure.

Figure 4:
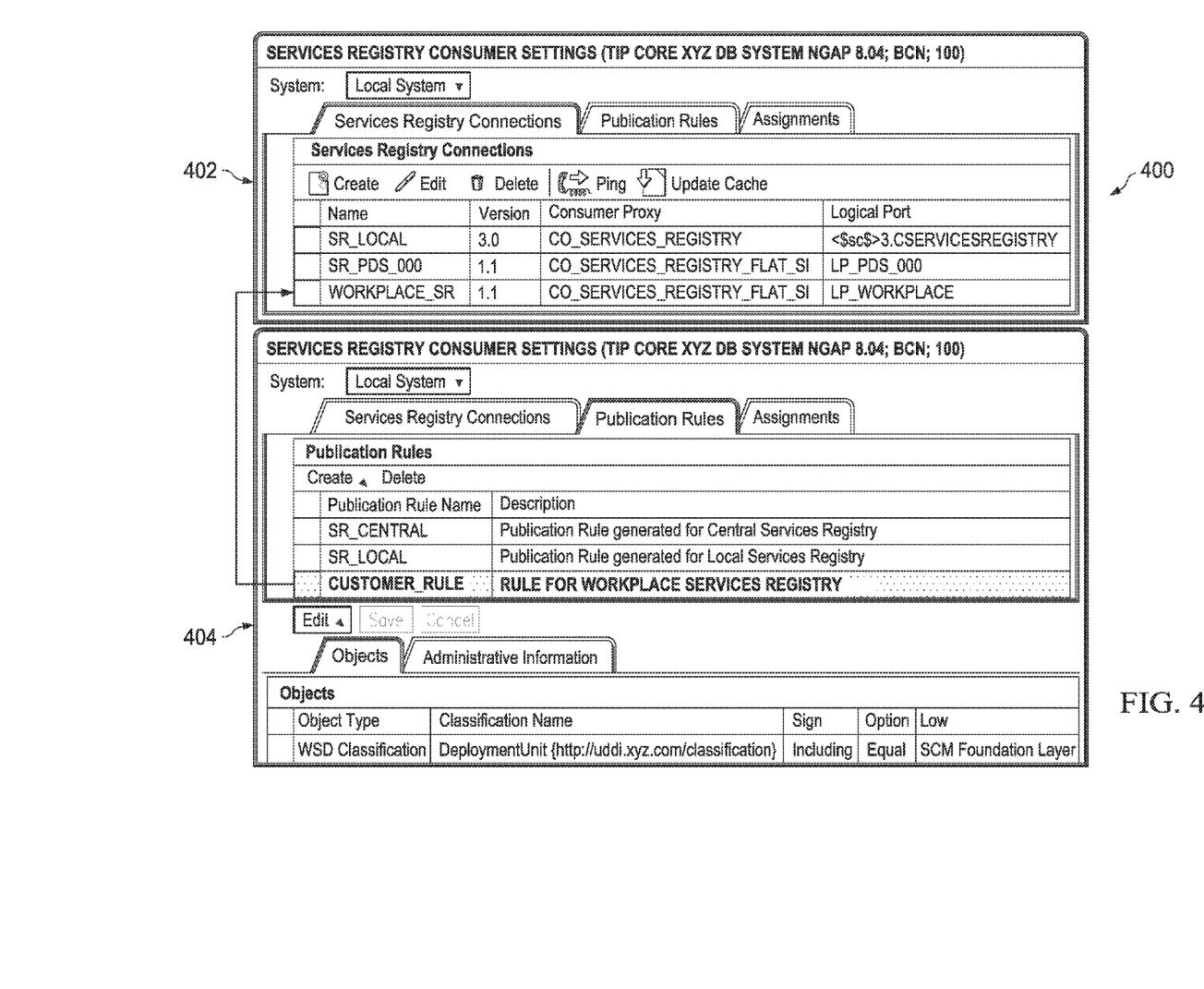
FIG. 4 is an example screenshot of a services registry consumer setting user interface.

FIG. 4 is an example screenshot 400 of a services registry consumer setting user interface. A user interface (UI) can be used to connect to services registries or another system, as shown in Tab 402 of FIG. 4. This is done by establishing a connection between the owner of services registry and the requesting device (such as a backend system administrator or a client device). This connection may be a handshake between two systems, assisted for example by an API, which may be a SOAP-based API. Based on the API, the backbone to exchange the messages between services registries or between the system or between the business system and the service registry is made. Then messages can be exchanged between the services registries.

Additionally, publication rules can be set using the Tab 404 shown in FIG. 4. Publication rules govern the exchange of information to business partners (or to partner services registries). Publication rules can also define the types or number of services exposed or available to business partners. By so doing, confidentiality can be maintained the between the partners.

Publication rules can be maintained in the system registry. The kind of information that may get published from one system to the next services registry is governed by the publication rules, which may be defined using the services registry UI and maintained at the services registry. The service name or the property of that service, which is associated with that service, can also be maintained at the services registry.

As an example, assuming one business partner is interested in CRM functionality, services registry publication rules for publication of CRM services information can be defined so that particular business partner gets published to my partner who is working on CRM kind of functionality. The second partner may be working on ERP-elected services, and the services registry can maintain another rule for that system. Different messages can be distributed, and different kinds of data can be distributed, to the two registries (associated with the partners running CRM and ERP, respectively), if there is such kind of separation desired. But in general, publication rules are a mechanism to distribute, to distinguish, and to discretize information so that it filters the right information and forwards it to the next services registry or backend system.

Figure 5:
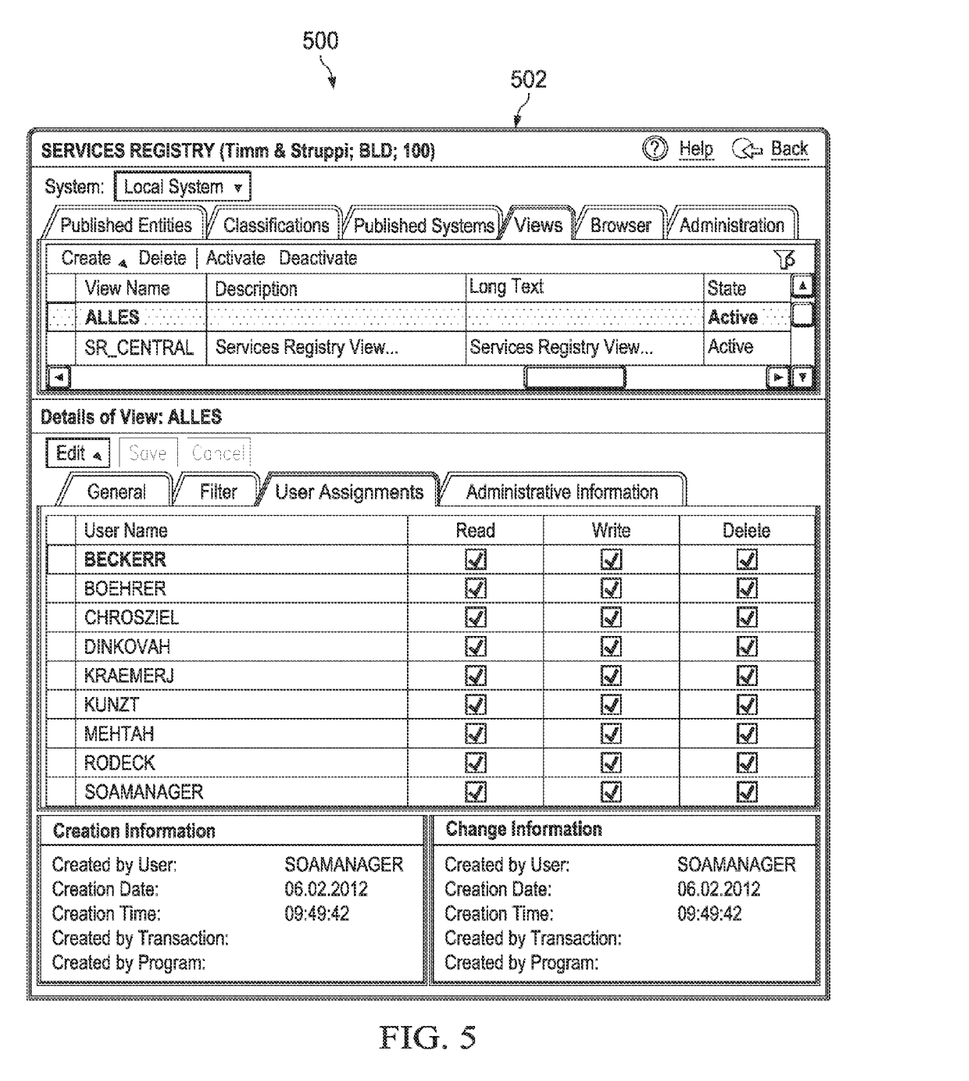
FIG. 5 is an example screenshot of a services registry UI showing a views tab.

FIG. 5 is an example screenshot 500 of a services registry UI showing a views tab 502. A "views" functionality can be configured at the services registry using a UI. The views parameter is a restriction or authorization for the receiver side (e.g., the consumer of information, whether a service provider or service consumer). The views parameter can be used to govern the information that gets published for the consumer of information. For example, a consumer may not want certain entities to be able to publish information into an inbox associated with the consumer. A views parameter can be configured by the consumer to filter information published to the consumer. The views parameter defines the entities that have authorization to read, write, or delete information from the consumer's inbox. In addition, the views parameter can govern what kind of information they can take and extract (e.g., because the information is confidential information, etc.).

Views in services registry make sure that only a specific user can access to a certain piece of information in Services Registry. Here, filters are defined in the form of classifications and then assigned to the users who are allowed to access this information. Information about read and write access is also maintained here. This way, it makes sure that the restricted information flows between the Systems and hence between the companies. There can be multiple views active in the system in the services area, and these views are then aligned to follow more users including existing users. Restrictions or flexibilities can be defined so that not everybody can publish content to a registry because the registry is interacting with the external systems, and it can contain the critical data.

A UI may also provide browsing functionality to the consumer to allow the consumer to browse available services, or other like functionality. For example, a consumer can retrieve information, such as service name, name space, WC URLs, documentation URLs, classifications of that service, etc.

The UI may be a web service such as i-docs, RFC, or any kind of connectivity information or service protocol. So they can also be registered with metadata so that the other partner or the other registries can accept this information and analyze based on the event happening on this service itself. There may be various services available. Assume these services are performing a task in the system, and some change occurs (e.g., information is uploaded in the first service), then this change will begin to reflect the right services. And this change will be propagated to the next connecting services so that the consumer of the next service gets notified by some message. The consumer can react on this event. In general, the propagation of information can ease the life cycle management of the whole system. Otherwise, the provider or the service provider has to somehow physically inform (e.g., call, e-mail, or other additional work) all the consumers. The messaging functionality can be useful in B2B scenarios, as well as in general within a landscape, including large system landscapes that include many service providers and consumer.

Figure 6:
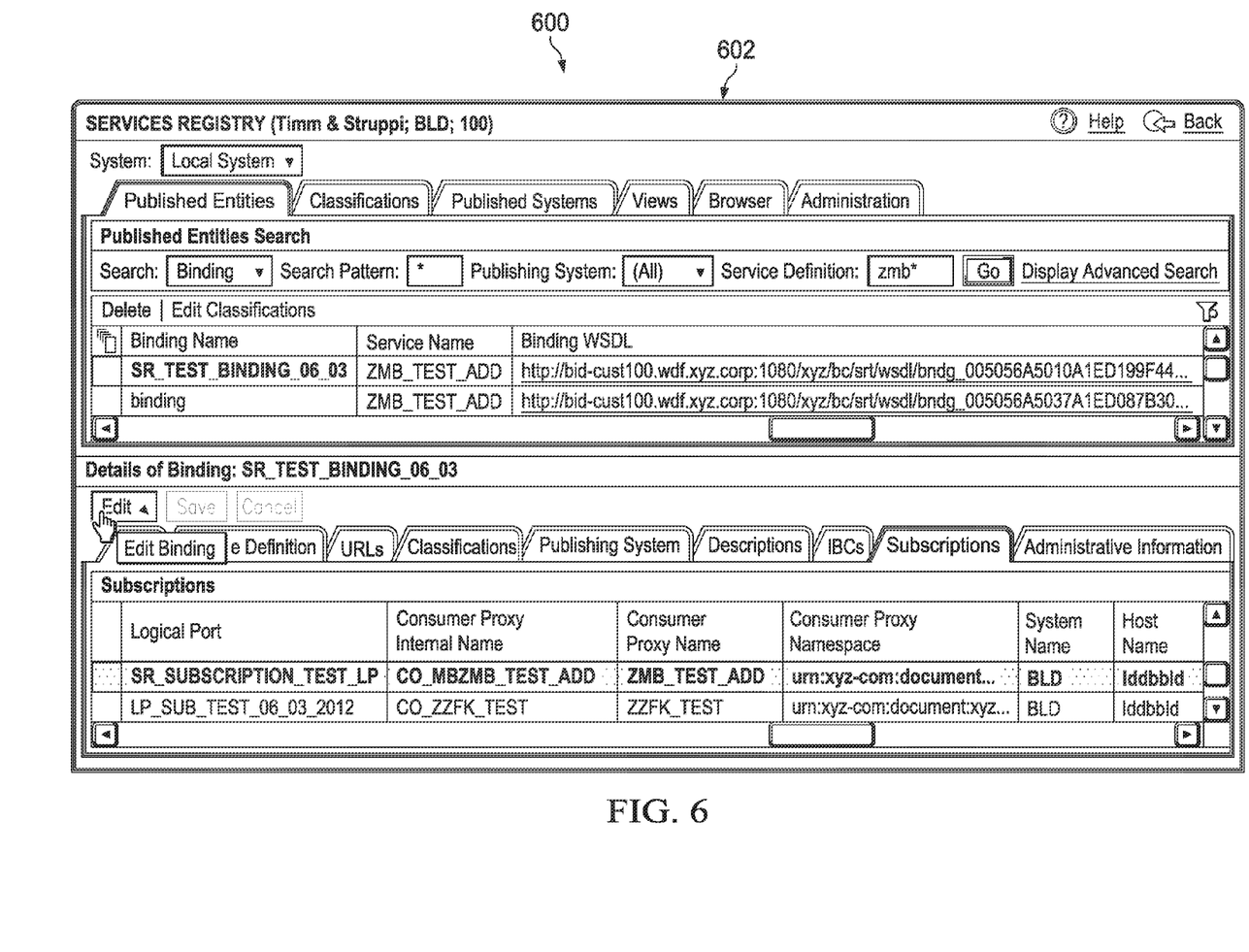
FIG. 6 is an example screenshot of a subscriptions tab of a services registry UI.

FIG. 6 is an example screenshot 600 of a subscriptions tab 602 of a services registry UI. The UI can provide an overview about connectivity entities in a landscape or beyond. It is capable of providing an answer to certain questions such as relationships between the entities (e.g. who are the subscribers of a service—to the extent that information is available). Customers can then benefit from such Services Registry based messaging infrastructure by sending the notifications to the subscribers in case there is an upcoming event which is effecting entities in the backend system.

Figure 7:
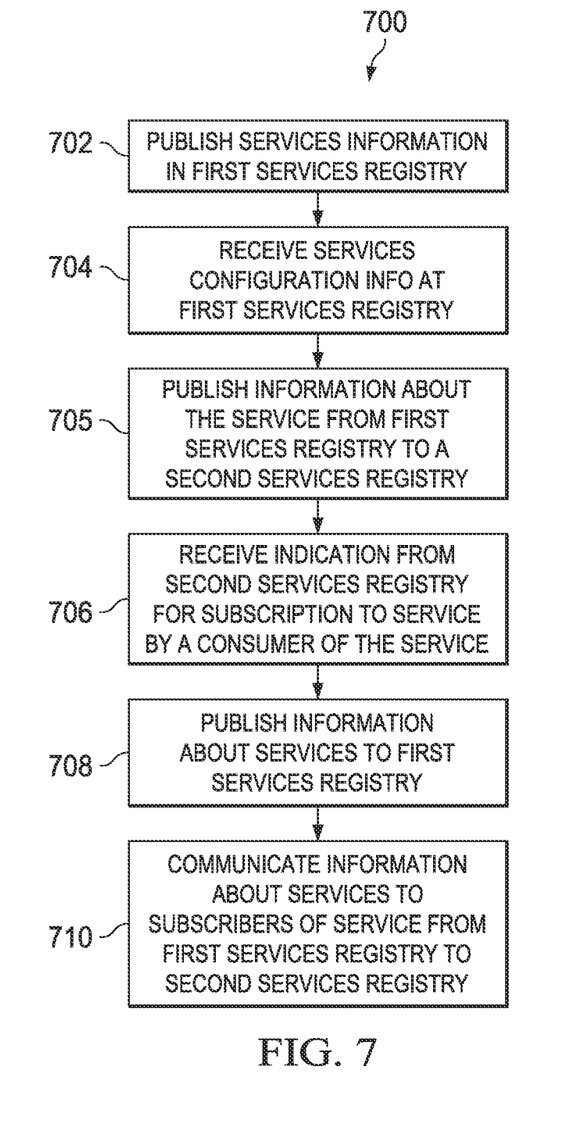
FIG. 7 is a process flow diagram of a message flow between two backend systems.

FIG. 7 is a process flow diagram 700 of a message flow between two backend systems. First, a backend system service provider publishes information to services registry 1 (702). Configuration information can be received (704). The configuration information can include publication information, views information, authentication credentials, etc. The configuration information can be received from a client device, an administrator, or an automatic system accessing information from a repository. The published information can be communicated to services registry 2 that resides in DMZ1 (705). The published information can be communicated to other services registries, which may be associated with backend system service consumer. Service consumer can query its services registry to receive information from service provider (e.g., using a pull function or a push function established between the backend system and its services registry). The service consumer can subscribe to the service provider, and the subscription message is communicated to the services registry associated with the service provider across the other services registries (706). If and when a change occurs at service provider, the service provider can republish the information to the services registry (708), and the republished information is communicated across services registries (710). The republished information can include a notification about the change or the change itself. The service consumer can then receive the updated information from services registry. Additionally, services registries can query other services registries to request information about service provider.

A number of implementations of the disclosure have been described. Nevertheless, it will be understood that various modifications may be made without departing from the spirit and scope of the disclosure. Accordingly, other implementations are within the scope of the following claims.

What is claimed is:

1. A system comprising:
   one or more computers;

a computer-readable medium storing instructions executable by the one or more computers to perform operations comprising:

publishing information about a service offered by a service provider at a first services registry of a plurality of interconnected services registries over one or more networks, wherein the first services registry is in a first network;

communicating the information about the service to remaining services registries of the plurality of services registries over the one or more networks, the remaining services registries including a second services registry in a second network separate from the first network;

receiving, over the one or more networks, by the first services registry and from the second services registry, an indication of a subscription to the service by a service consumer;

communicating, over the one or more networks, by the first services registry and to the second services registry information about the subscribed service;

receiving, at the first services registry and from the service provider, a change to the service; and communicating, over the one or more networks and by the first services registry, the change to the remaining services registries including the second services registry; and communicating, by a third services registry in a third network separate from the first network and the second network, information between the second services registry and a second service provider, wherein the second service provider is in the second network.

2. The system of claim 1, wherein the first services registry is separated from the second services registry by a firewall.

3. The system of claim 1, wherein the second services registry is configured to publish information describing a service offered by a second service provider, wherein the second service provider is in the second network.

4. The system of claim 1, wherein the first services registry locally stores system information about the service provider and the service consumer, wherein the system information includes description, documentation and classifications associated with the service provider.

5. The system of claim 1, wherein the first services registry is configured to identify authorized users of information contained in the indication.

6. The system of claim 1, wherein the first services registry filters data in the information based on a rule and transmits the filtered information to the second services registry.

7. The system of claim 1, wherein the information includes one or more of information about the service provider, routing information, or publishing time stamps.

8. The method of claim 1, further comprising:

receiving, by the first services registry from the second services registry and over the one or more networks, a query, received through a graphical user interface provided by the second services registry at a client computer, requesting information associated with the service provider;

transmitting, by the first services registry to the service provider, the query;

determining, by the first services registry, information that satisfies the query from the service provider; and transmitting, by the first services registry to the second services registry and over the one or more networks, the information that satisfies the query from the service provider.

9. A computer-implemented method comprising:

publishing information about a service offered by a service provider at a first services registry of a plurality of interconnected services registries over one or more networks, wherein the first services registry is in a first network;

communicating the information about the service to remaining services registries of the plurality of services registries over the one or more networks, the remaining services registries including a second services registry in a second network separate from the first network;

receiving, over the one or more networks, by the first services registry and from the second services registry, an indication of a subscription to the service by a service consumer;

communicating, over the one or more networks, by the first services registry and to the second services registry information about the subscribed service;

receiving, at the first services registry and from the service provider, a change to the service;

communicating, over the one or more networks and by the first services registry, the change to the remaining services registries including the second services registry; and communicating, by a third services registry in a third network separate from the first network and the second network, information between the second services registry and a second service provider, wherein the second service provider is in the second network.

10. The method of claim 9 further comprising receiving configuration information about the service at the first services registry; and wherein communicating, over the one or more networks, by the first services registry and to the second services registry information about the subscribed service is based on the configuration information.

11. The method of claim 10, wherein the configuration information includes one or more of publication authorization information, viewer authorization information, subscription information, or read/write authorization.

12. The method of claim 9, wherein the first services registry is separated from the second services registry by a firewall.

13. The method of claim 9, wherein the second services registry is associated with the service consumer.

14. The method of claim 9, wherein communicating, over the one or more networks, by the first services registry and to the second services registry information about the subscribed service comprises communicating information about the service provider.

15. A non-transitory computer-readable medium storing instructions executable by one or more computers to perform operations comprising:

publishing information about a service offered by a service provider at a first services registry of a plurality of interconnected services registries over one or more networks, wherein the first services registry is in a first network;

communicating the information about the service to remaining services registries of the plurality of services registries over the one or more networks, the remaining services registries including a second services registry in a second network separate from the first network;

receiving, over the one or more networks, by the first services registry and from the second services registry, an indication of a subscription to the service by a service consumer;

communicating, over the one or more networks, by the first services registry and to the second services registry information about the subscribed service;

receiving, at the first services registry and from the service provider, a change to the service;

communicating, over the one or more networks and by the first services registry, the change to the remaining services registries including the second services registry; and communicating, by a third services registry in a third network separate from the first network and the second network, information between the second services registry and a second service provider, wherein the second service provider is in the second network.

16. The non-transitory computer-readable medium of claim 15 further comprising instructions for receiving configuration information about the service at the first services registry; and wherein communicating, over the one or more networks, by the first services registry and to the second services registry information about the subscribed service is based on the configuration information.

17. The non-transitory computer-readable medium of claim 16, wherein the configuration information includes one or more of publication authorization information, viewer authorization information, subscription information, or read/write authorization.

18. The non-transitory computer-readable medium of claim 15, wherein communicating, over the one or more networks, by the first services registry and to the second services registry information about the subscribed service comprises communicating information about the service provider.

19. The non-transitory computer-readable medium of claim 15, the operations further comprising:

receiving, by the first services registry from the second services registry and over the one or more networks, a query, received through a graphical user interface provided by the second services registry at a client computer, requesting information associated with the service provider;

transmitting, by the first services registry to the service provider, the query;

determining, by the first services registry, information that satisfies the query from the service provider; and transmitting, by the first services registry to the second services registry and over the one or more networks, the information that satisfies the query from the service provider.

* * * * *